United States Patent [19]

Matsuzaki et al.

[11] Patent Number: 5,418,969
[45] Date of Patent: May 23, 1995

[54] LOW POWER CONSUMPTION MICROPROCESSOR

[75] Inventors: Toshimichi Matsuzaki, Mino; Masashi Deguchi, Nara, both of Japan

[73] Assignee: Matsushita Electric Industrial Co., Ltd., Osaka, Japan

[21] Appl. No.: 278,102

[22] Filed: Jul. 20, 1994

Related U.S. Application Data

[63] Continuation of Ser. No. 677,128, Mar. 29, 1991, abandoned.

[30] Foreign Application Priority Data

Mar. 30, 1990 [JP] Japan ................................. 2-86507

[51] Int. Cl.⁶ .......................... G06F 1/08; G06F 1/18
[52] U.S. Cl. ................................. 395/750; 395/550;
364/232.8; 364/270; 364/273.1; 364/273.2; 364/DIG. 1
[58] Field of Search ..................... 395/550, 750, 775

[56] References Cited

U.S. PATENT DOCUMENTS

| | | | |
|---|---|---|---|
| 4,698,748 | 10/1987 | Juzswik et al. | 395/750 |
| 4,819,164 | 4/1989 | Branson | 395/550 |
| 4,870,570 | 9/1989 | Satoh et al. | 395/750 |
| 4,893,271 | 1/1990 | Davis et al. | 395/550 |
| 5,021,679 | 6/1991 | Faibanks et al. | 307/66 |
| 5,218,704 | 6/1993 | Watts, Jr. et al. | 395/750 |

FOREIGN PATENT DOCUMENTS

WO85/02275  5/1985  WIPO.
WO86/00432  1/1986  WIPO.

OTHER PUBLICATIONS

"Memory Controller Which Automatically Adjusts to Changes in System Clock Rate", IBM Technical Disclosure Bulletin, vol. 32, No. 8A, Jan. 1990, p. 265.
"NS32CG 16 Technical Design Handbook", 1988, p. 25.

*Primary Examiner*—Robert B. Harrell
*Assistant Examiner*—Ayni Mohamed
*Attorney, Agent, or Firm*—Wenderoth, Lind & Ponack

[57] ABSTRACT

A microprocessor which reduces power consumption by monitoring the operating status of a plurality of operating units in the microprocessor to extract the unit which is recently most infrequently used to change the frequency of the operating clock supplied thereto in steps.

3 Claims, 5 Drawing Sheets

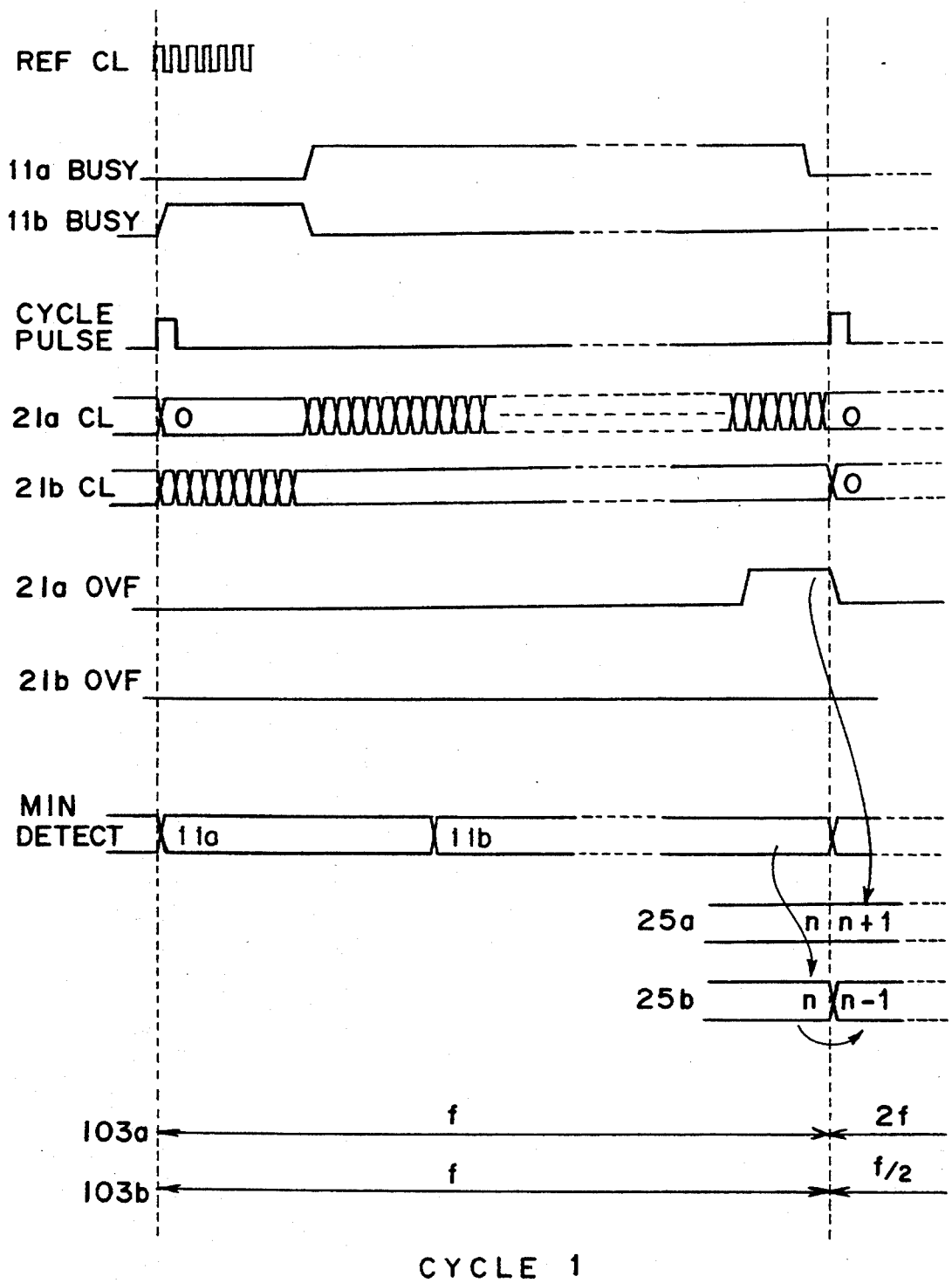

ONE CLOCK WAIT

LOW POWER CONSUMPTION MICROPROCESSOR

This application is a continuation of now abandoned application, Ser. No. 07/677,128, filed on Mar. 29, 1991.

BACKGROUND OF THE INVENTION

1. Field of the Invention

The present invention relates to a low power consumption microprocessor comprising a plurality of operating units.

2. Description of the Prior Art

The general trend towards smaller sizes in products using large scale integration (LSI) circuit devices has increased the need to reduce the power consumption of component LSI devices. Various measures have been taken to reduce LSI device power consumption, including both device structure and circuit design innovations, and other innovations have also been applied to microprocessors and microcomputers. For example, in the NS32CG16 microcomputer manufactured by National Semiconductor Corp. of the United States, power consumption is reduced by applying a command to set a suitable value in the internal control register which changes the operating frequency of the microcomputer, as disclosed in National Semiconductor NS32CG16 Technical Design Handbook 1988.

CMOS devices are used for many microprocessors as a means of achieving high integration. Because the power consumption of CMOS devices is approximately proportional to the operating frequency of the device, reducing the clock rate of the microcomputer within the range which will not adversely affect the processing capacity of the device can effectively achieve a low power consumption device. In addition, by using a completely static circuit structure in the CMOS processor, the internal state of the processor can be maintained even if the operating clock is stopped.

A method for reducing power consumption by controlling the operation of an oscillator or stopping the supply of the operating clock to the microcomputer circuits by applying a command is .described in U.S. Pat. Nos. 4,748,559 and 4,758,945. However, because the operating frequency is changed programmatically by these methods, it is not possible to continue executing a conventional program in a processor with a power-saving function. In addition, it is difficult to provide control for precision power reduction.

SUMMARY OF THE INVENTION

Therefore, an object of the present invention is to provide a low power consumption microprocessor which can reduce the power consumed in a processor while retaining program compatibility.

To achieve this object, a low power consumption microprocessor according to the present invention comprises a clock supply means which monitors the operating status of plural operating units in the microprocessor to extract the unit which is recently used most infrequently and therefore reduces the operating clock supplied to that unit in steps, a clock generating means which generates plural clocks, a clock selection means which selects the target clock from among plural clocks as commanded by the clock supply means, and an interrupt controller which detects external interrupts and orders the clock supply means to raise the operating clock accordingly.

A low power consumption microprocessor according to the present invention constructed as thus described retains program compatibility and provides for reduced power consumption.

BRIEF DESCRIPTION OF THE DRAWINGS

The present invention will become more fully understood from the detailed description given below and the accompanying diagrams wherein:

FIG. 4 is a timing chart showing the operation of the clock supply means;

DESCRIPTION OF PREFERRED EMBODIMENT

Figure 1:
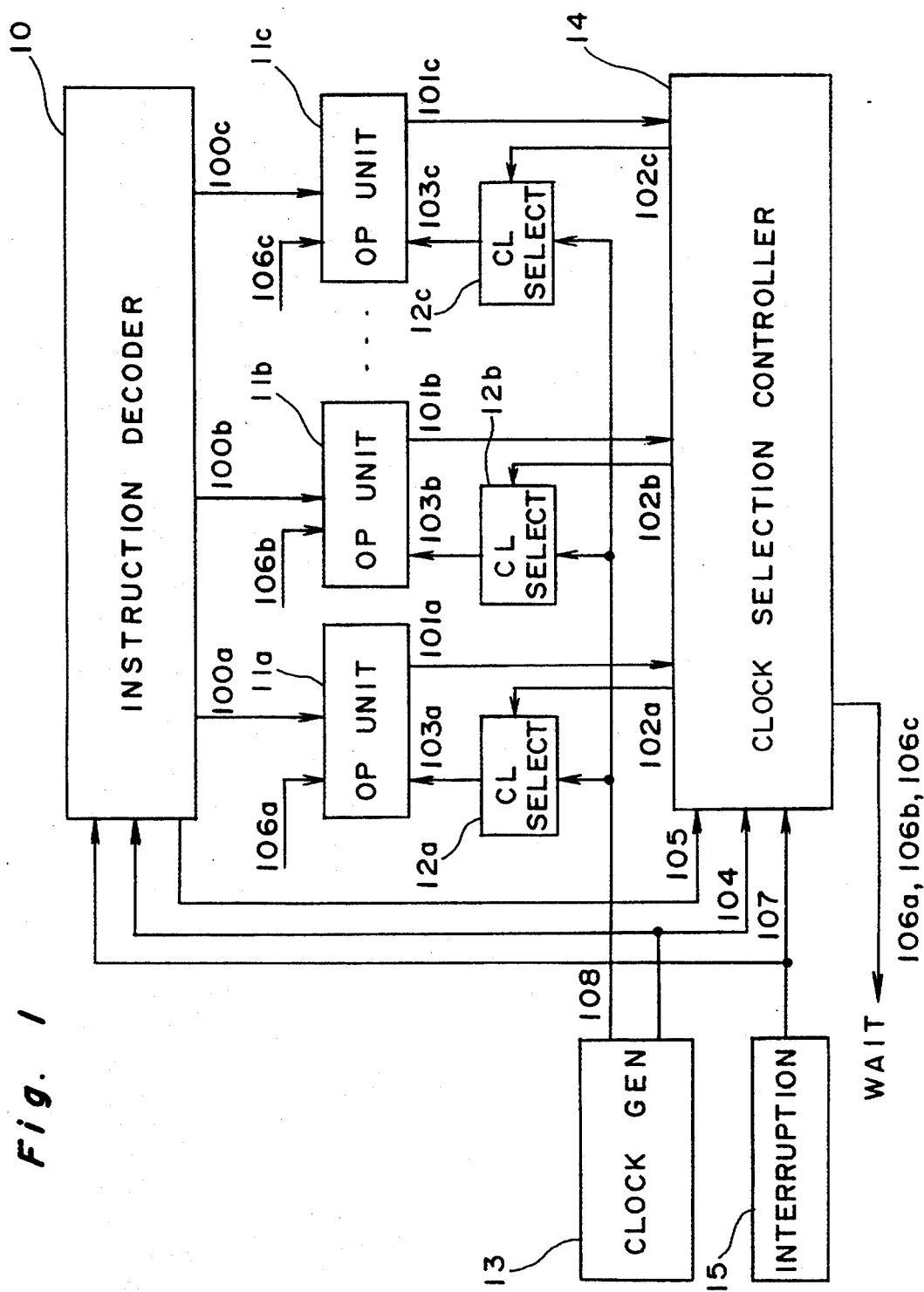
FIG. 1 is a block diagram of a low power consumption microprocessor according to a preferred embodiment of the present invention.

FIG. 1 is a block diagram of a low power consumption microprocessor according to a preferred embodiment of the present invention.

As shown in FIG. 1, the microprocessor comprises an instruction decoder 10 which controls a plurality of operating units 11a, 11b and 11c by control signals transmitted along lines 100a, 100b and 100c, respectively. The operating units 11a, 11b and 11c are each dedicated to effect particular processing, for example, integer operations or floating point operations. Each of these operating units 11a, 11b and 11c produces a busy signal which is a HIGH level when the operating unit is in an operating condition, and which are a LOW level when the operating unit is in a non-operating condition. The busy signals from the operating units 11a, 11b and 11c are transmitted along lines 101a, 101b and 101c, respectively, which are supplied to clock selection controller 14 and indicate whether or not the operating unit is operating.

The microprocessor further comprises: a clock generator 13 which generates a reference clock having a frequency f and transmitted along line 104 for use internally in the microprocessor and a plurality of clocks having different frequencies, e.g., f/4, f/2, f, 2f, 4f and 8f and transmitted along line 108; a clock selection controller 14 which monitors the operating status of each of the operating units 11a, 11b and 11c by the busy signals transmitted along lines 101a, 101b and 101c, and produces clock selection signals along lines 102a, 102b and 102c; and a plurality of clock selectors 12a, 12b and 12c each of which selects, according to the clock selection signal on lines 102a, 102b and 102c from the clock selection controller 14, one clock signal for use in the corresponding operating unit. Thus, the operating unit which is operating intensively is supplied with a relatively high frequency clock, the operating unit which is operating moderately is supplied with an intermediate range frequency clock, and the operating unit which is operating infrequently is supplied with a relatively low frequency clock. The variation of the clock frequency presented by the clock generator 13 is a multiple of two, but any other variation can be selected.

Since the power consumed in each operating unit is reduced relatively to the reduction of the clock frequency, the operating units supplied with relatively low frequency clocks will consume less power than the normal power consumption rate. Thus, the power saving can be achieved. The detail of the clock selection controller 14 will be given herein below.

Figure 2:
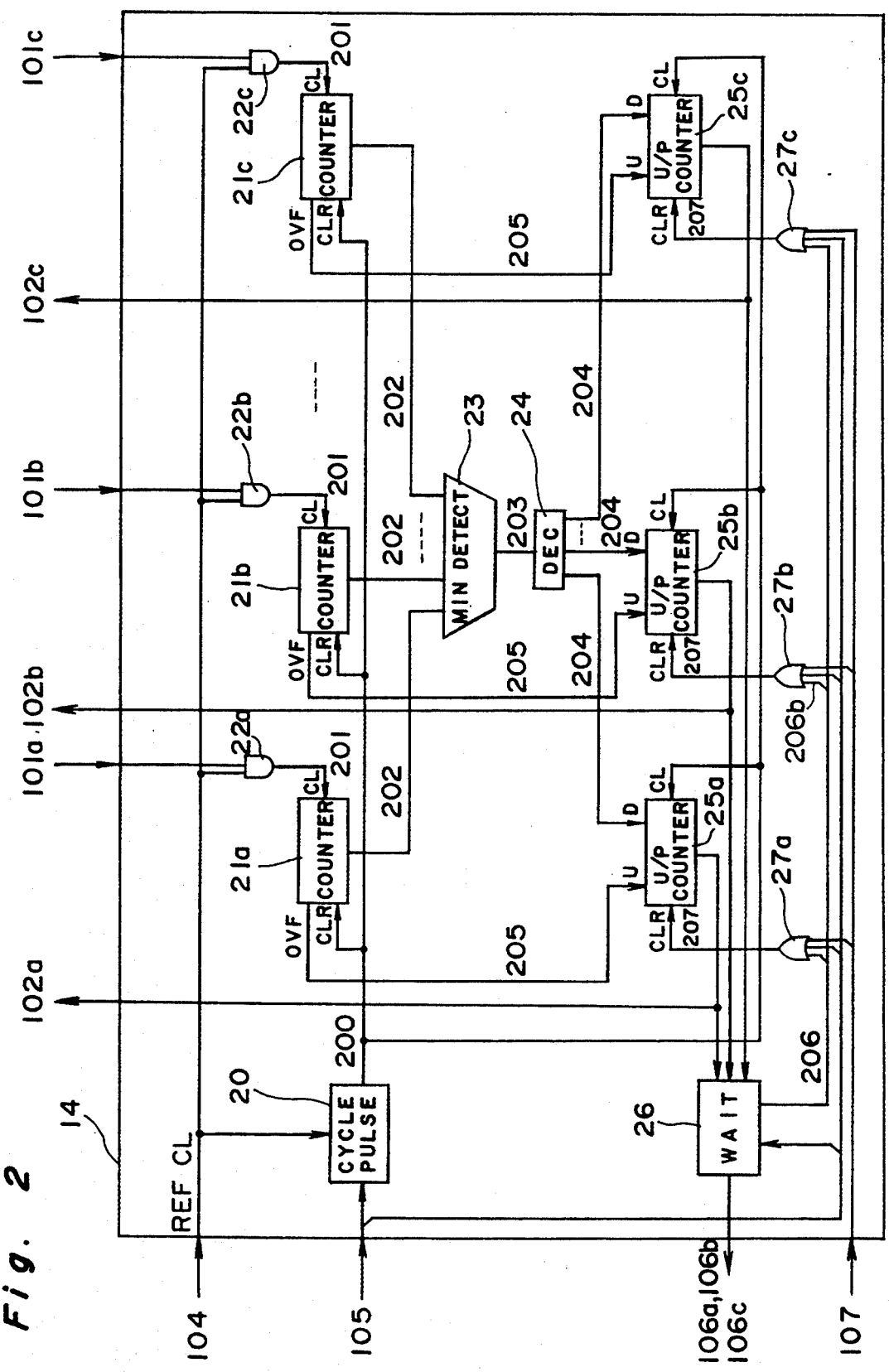
FIG. 2 is a block diagram of the internal structure of the clock supply means in the first embodiment of the present invention.

Referring to FIG. 2, a block diagram of the clock selection controller 14 according to the preferred embodiment of the present invention is shown. The clock selection controller 14 comprises a cycle pulse generator 20 which generates cycle pulses along a line 200. For example, the cycle pulse generator 20 produces one cycle pulse per 128 reference clocks from line 104 so as to determine the cycle period of one cycle according to a cycle period command 105 from the instruction decoder 10.

A plurality of counters 21a, 21b and 21c are provided each having a clear terminal CLR, a clock terminal CL and an overflow terminal OVF. The clear terminal CLR is connected to cycle pulse generator 20, so that the counters 21a, 21b and 21c are cleared at the beginning of each cycle. The clock terminal CL is connected to an output of AND gate 22 through line 201. The two inputs of AND gate 22 are connected respectively to the clock generator 13 for receiving the reference clock and to the corresponding operation unit 100 through line 101 to receive the busy signal. Therefore, when the busy signal is in HIGH level, the AND gate is enabled to supply the reference clock to counter 21.

Each counter 21 is arraigned to count up to a number less than the cycle period. For example, according to the present embodiment, counter 21 is arranged to count up to 64 reference clocks. When counter 21 has counted up to 64, one overflow pulse is produced and, at the same time, the counter 21 is cleared, ready for counting up again from the beginning. Thus, in operation, when the busy signal is present, counter 21 counts up the reference clock (frequency f), and when the busy signal is absent, counter 21 pauses to refrain from counting the reference clock. Thus, the counted result of counter 21 indicates the working rate of operation unit 11. According to the present embodiment, since one cycle period is set equal to 128 reference clocks, one overflow pulse is produced in one cycle when the counter 21 has counted up to 64, meaning that the operation unit 11 has operated at the rate greater than 50% of cycle period; and two overflow pulses are produced in one cycle when the counter 21 has counted up to 128, meaning that the operation unit 11 has operated full rate with the reference clock during the cycle period.

A minimum value detector 23 has a plurality of inputs for receiving the counted results from counters 21a, 21b and 21c and detects which one of the counters is carrying the minimum value. Thus, the minimum value detector 23 produces a minimum counter signal indicative of a counter carrying the minimum counted value. The minimum counter signal is applied through a line 203 to a decoder 24 which produces a plurality of signals indicating the counter with the minimum counted value. For example, when the last counter 21c is carrying the minimum counted value, decoder 24 produces an array of signals (00 ... 1).

A plurality of up-down counters 25a, 25b and 25c are provided each having an up-count terminal U, a down-count terminal D, a clear terminal CLR and a clock terminal CL. The up-count terminal U is connected to the overflow terminal OVF of the corresponding counter 21, the down-count terminal D is connected to the corresponding one output of decoder 24, the clock terminal CL is connected to the cycle pulse generator 20, and the clear terminal CLR is connected to an output of corresponding OR gate 27a, 27b or 27c.

Each of OR gates 27a, 27b and 27c has three inputs which are connected respectively to line 107 for receiving an interruption signal from an interruption generator 15, line 105 for receiving a clear command from instruction decoder 10 and line 206 for receiving a wait signal from a wait control circuit 26.

The wait control circuit 26 receives counted results from up-down counters 25a, 25b and 25c, and also the clear command from instruction decoder 10, so as to detect the need for data transfer between units of different operating speeds. Based on the detected result, the wait control circuit 26 produces a wait signal 106 to the instruction decoder 10 so as to match the operating clock of the units by providing a clear signal along line 206.

Figure 3:
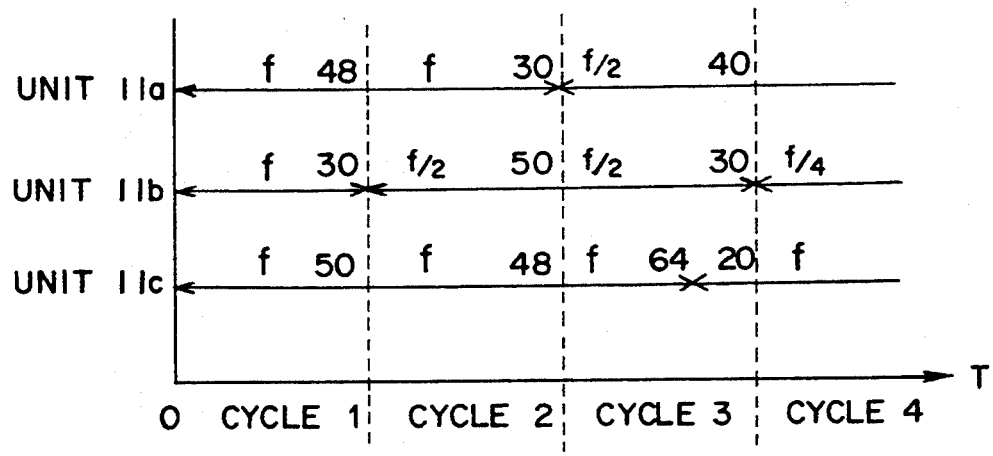
FIG. 3 is a timing chart showing the operation of the preferred embodiment.

Referring to FIG. 3, a timing chart of operation of the low power consumption microprocessor according to the embodiment of the present invention is shown, particularly illustrating the change in the operating clock frequency of each of three units 11a, 11b and 11c.

At time 0, up-down counters 25 are reset to initial value N. Thus, N is applied through lines 102a, 102b and 102c to clock selectors 12a, 12b and 12c. Thus, a clock selectors 12a, 12b and 12c selects and supplies clocks at the reference frequency f to operation units 11a, 11b and 11c during cycle 1.

During cycle 1, each of operation units 11a, 11b and 11c is operated intermittently. Thus, the counted results of counters 21a, 21b and 21c at the end of cycle 1 are, for example, 48, 30 and 50, respectively, as indicated at the end of cycle 1 in FIG. 3. In this case, since the minimum number is 30 decoder 24 provides "1" to terminal D of up-down counter 25b. Thus, up-down counter 25b counts down to N−1, while other counters 25a and 25c maintains the number N. Accordingly, at the end of cycle 1, N is applied through lines 102a and 102c to clock selectors 12a and 12c. Thus, clock selectors 12a and 12c continues to select clocks at the reference frequency f, which are applied to units 11a and 11c. Also, at the end of cycle 1, N−1 is applied through line 102b to clock selector 12b. Thus, clock selector 12b changes the selection to select the clock with one level reduced clock frequency, e.g., f/2.

Thus, cycle 2 starts with clock frequency f for units 11a and 11c, and clock frequency f/2 for unit 11b. In this manner, the clock frequency is reduced to one level lower clock frequency for the operation unit that has the smallest operation rate in the previous cycle.

At the start of cycle 3, it is assumed that clock selectors 12a and 12b are selecting the clocks with frequency f/2, and clock selector 12c is selecting the clock with frequency f. When the operation unit 11c operates at a relatively high rate to have counter 21c to count up to 64 at the mid of cycle 3, one overflow pulse is produced from counter 21c to cause up-count of counter 25c to N+1. Thus, from this moment, N+1 is applied through line 102c to clock selector 12c which then changes the selection to select the clock with one level higher clock frequency, e.g., 2f. When the up-count is effected in up-down counter 25, the D terminal is disabled for the instant cycle, so that the same up-down counter will not be decreased at the end of the cycle even if that up-down counter receives "1" to its D terminal.

In this modification, the clock frequency is increased in immediate response to the generation of the overflow signal, even during the mid of the operation cycle, and the same is decreased at the end of each cycle.

Referring to FIG. 4, another timing chart of operation of the low power consumption microprocessor according to the embodiment of the present invention is shown, particularly illustrating the modification in operation of counters 21 and 25. (Only the signals related to units 11a and 11b are shown)

During the generation of the busy signal from operation unit 11, counter 21 counts up the reference clock. When a counter, for example counter 21a, has counted up to 64, an overflow signal OVF is generated, and the further counting of counter 21a is terminated. In the meantime, the decoder 24 coupled with minimum detector 23 produces a signal indicating which one of the operation units is being operated at the lowest rate. At the end of each cycle, a up/down counter which is receiving an overflow signal OVF, such as up/down counter 25a is incremented, and a up/down counter which is receiving a signal indicating the lowest operation rate, such as up/down counter 25b is decreased. Thus, in the next operation cycle, clock selector 12a selects a clock with one level higher clock frequency, e.g., 2f, and clock selector selects a clock with one level lower clock frequency, e.g., f/2.

In this modification, the clock frequency is increased or decreased only at the end of each cycle.

Figure 5:
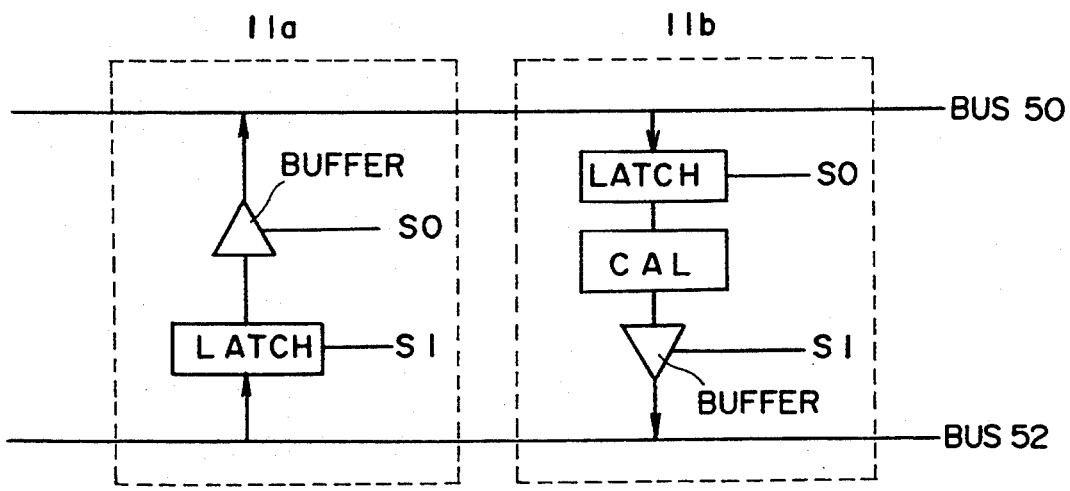
FIG. 5 is a block diagram used to describe data transfer between operating units.

Referring to FIGS. 5 and 6, the description is now directed to the operation when data is exchanged between two operation units, such as units 11a and 11b.

Referring particularly to FIG. 5, the data stored in a buffer of unit 11a is sent through a BUS 50 to a latch of the operation unit 11b, and the processed data by the calculation means in unit 11b. The calculated result is shifted to a buffer in unit 11b and sent back through a BUS 52 to a latch of the operation unit 11a. The buffer in unit 11a and the latch in unit 11b are operated only during the first half clock period S0 of each clock cycle period, and the buffer in unit 11b and the latch in unit 11a are operated only during the second half clock period S1 of each clock cycle period.

Figure 6A:
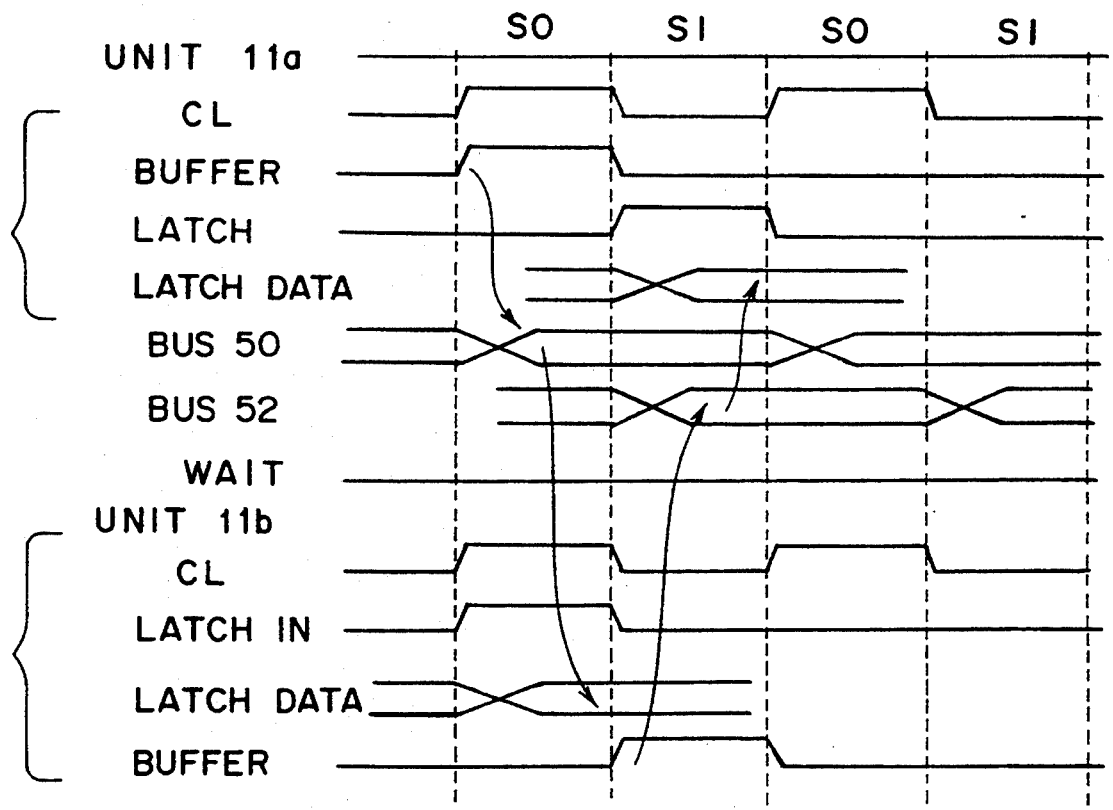
FIGS. 6a–6b are timing charts used to describe data transfer between operating units.

Referring to FIG. 6a, a case when both units 11a and 11b are receiving the clocks with the same frequency is shown. In this case, the wait control circuit 26 produces on wait signal. In the first half clock period S0, the data stored in buffer in unit 11a is output to the BUS 50 and further to the latch in unit 11b. Then, within the same half clock period S0, the calculation means calculates the latched data.

In the second half clock period S1 of the same clock period, the calculated result by the unit 11b is shifted to the buffer thereof and further output to the BUS 52. Then the data is stored in the latch of the unit 11a.

Figure 6B:
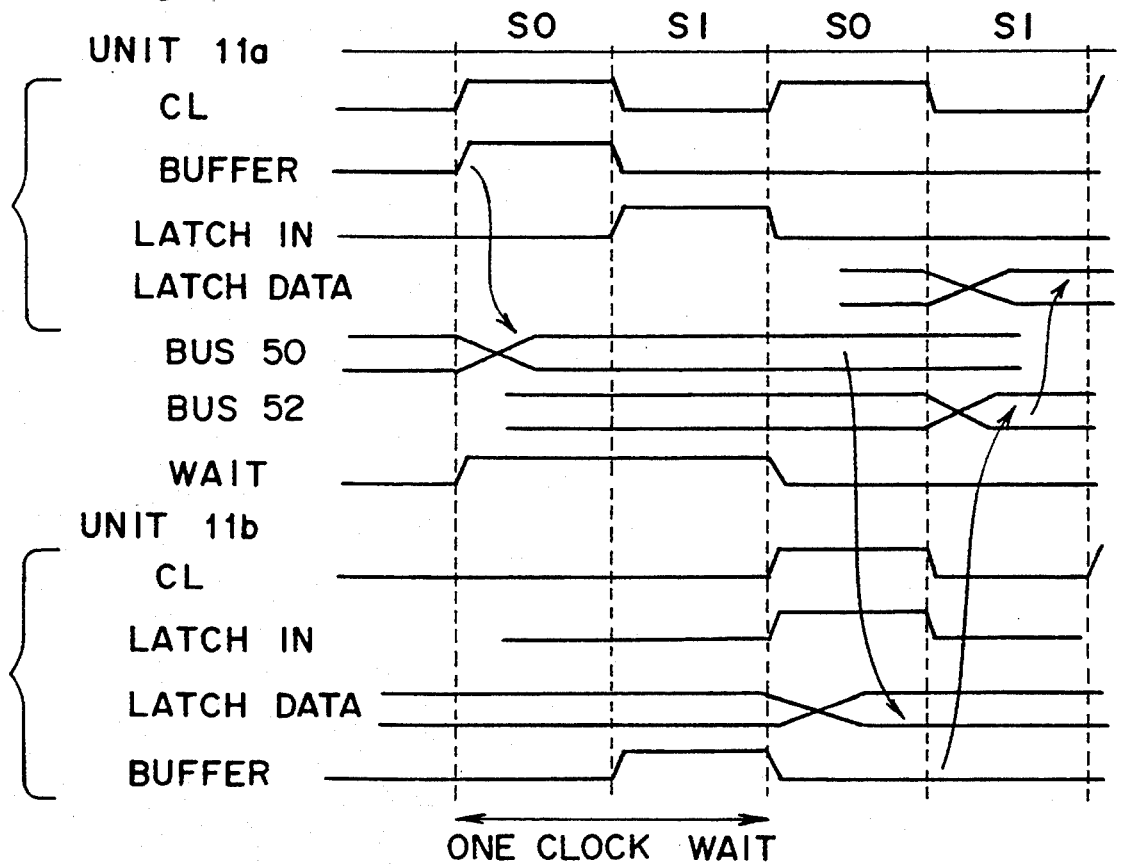

Referring to FIG. 6b, a case when units 11a and 11b are receiving the clocks with different frequencies is shown. In this case, the wait control circuit 26 produces a wait control signal WAIT along line 106b and also a matching signal along line 206b to up/down counter 25b. The wait control signal WAIT continues for one clock period of the clock supplied to the data receiving unit 11b. In the first half clock period S0, operation unit 11a outputs the contents of the buffer in unit 11a to BUS 50. In this case, since the wait control circuit 26 is producing a WAIT signal along line 106b, the instruction decoder 10 holds the current state until unit 11b enters the next half clock period S0. Thus, when the unit 11b enters the next half clock period S0, the data on the BUS 50 is taken by the latch in unit 11b. Then, within the same half clock period S0, the calculation means calculates the latched data.

In the next half clock period S1, the calculated result by the unit 11b is shifted to the buffer thereof and further output to the BUS 52. Then the data is stored in the latch of the unit 11a.

Since the wait control circuit 26 is also producing a matching signal to up/down counter 25b, the content of up/down counter 25b is matched with the content of up/down counter 25a, so that in the next clock period, the unit 11b will operate with the same clock frequency as that of the unit 11a.

It is to be noted that instead of the match signal, the wait control circuit 26 may produce a reset signal to both up/down counters 25a and 25b, so that the two counters 25a and 25b, between which the data exchange is to be carried out, produces N to cause units 11a and 11b to operate with the reference clock having the frequency f.

It is also to be noted that while three operating units 11a, 11b and 11c were used in the above description, any other number of operating units may actually be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A low power consumption microprocessor comprising:
   a plurality of operation units for processing operations of different types;
   a working rate detecting means for detecting the working rate of each of said operation units and for producing a working rate data for each unit;
   a clock generating means for generating a plurality of operation clocks of different frequencies relatively to various working rate data;
   a plurality of clock selecting means coupled to said operation units, respectively, for selecting, in response to the receipt of said working rate data, a clock for each unit with a frequency determined by said respective working rate data;
   wherein each of said operation units produces a busy signal when the unit is being operated;
   and wherein said working rate detecting means comprises:
   a plurality of first counter means respectively provided in association with said plurality of operation units, each of said first counter means counting a clock with a predetermined frequency during the presence of said busy signal, and for producing an overflow signal when a predetermined number of clocks is counted;
   a plurality of second counter means respectively provided in association with said plurality of first counter means, each of said plurality of second counter means counting said overflow signal and producing said working rate data relative to the counted overflow signal; and
   a minimum detector means for detecting a first counter means with the minimum counted result and for producing a decrement signal which is supplied to said second counter means associated with the first counter means detected by said minimum detector means to decrement said working rate data.

2. A low power consumption microprocessor as claimed in claim 1, further comprising an instruction decoder means for controlling data exchange between the units.

3. A low power consumption microprocessor as claimed in claim 1, further comprising a wait control means for producing a wait signal when two units, operating with different clock frequencies, exchange data.

* * * * *